TAPE REPRODUCING SYSTEM

Filed Feb. 26, 1958

3 Sheets-Sheet 1

INVENTOR.
ERIC M. LEYTON

BY [signature]
ATTORNEY

INVENTOR.
ERIC M. LEYTON
BY
[signature]
ATTORNEY

Nov. 15, 1960 E. M. LEYTON 2,960,568

TAPE REPRODUCING SYSTEM

Filed Feb. 26, 1958 3 Sheets-Sheet 3

INVENTOR.
ERIC M. LEYTON
BY
W. H. Sprague
ATTORNEY

United States Patent Office 2,960,568

Patented Nov. 15, 1960

2,960,568

TAPE REPRODUCING SYSTEM

Eric M. Leyton, Princeton, N.J., assignor to Radio Corporation of America, a corporation of Delaware Filed Feb. 26, 1958, Ser. No. 717,622

19 Claims. (Cl. 178—6.6)

Figure 1:
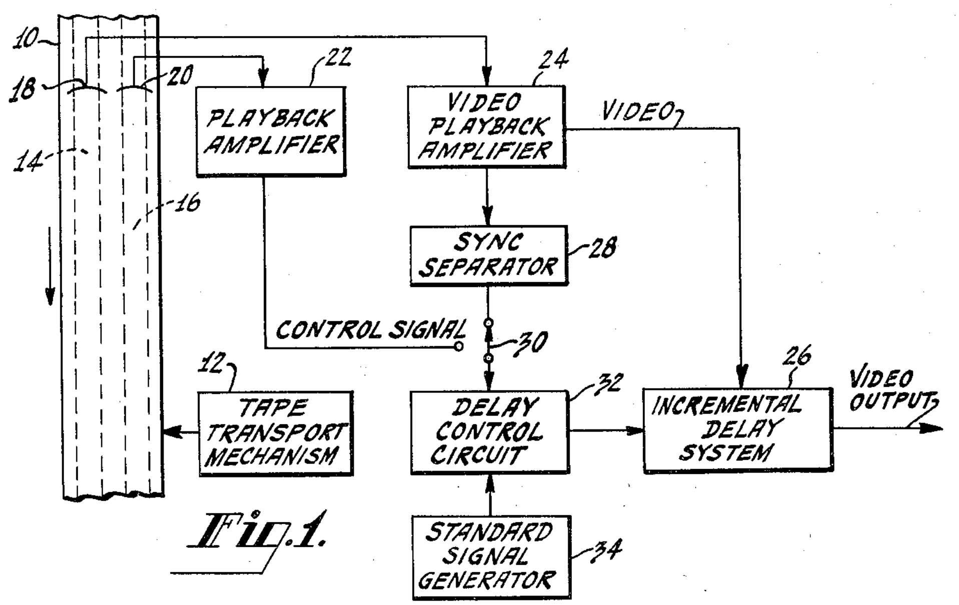

This invention relates to a system for correcting reproduced signals recorded on a movable storage medium and, more particularly, to apparatus for overcoming the effects of undesired timing variations incident to the reproduction of electrical signals recorded on one or more portions of a movable magnetic storage medium.

Several systems are now in existence for recording wide band frequency signals on a movable storage medium such as a magnetic tape. One such system records the signals in a longitudinal direction on the tape, that is, in the direction of tape movement as the tape is moved in the direction of its length. Another system is the so-called lateral scan system such as that described in the De Forrest Patent Number 2,743,318. In the lateral scan system, the magnetic recording tracks are defined on the tape by a rotating head assembly which scans the tape transversely (across its width) as the tape is moved in the direction of its length past the rotating head assembly.

Regardless of the system employed, it is quite difficult to obtain accurate recording and reproduction of signal intelligence. To obtain accurate recording and reproduction, the relative motion between those areas on the recording medium containing recorded representations and the transducing means must remain the same during recording as during playback. The degree of relative uniformity of motion required depends upon the amount of distortion permissible in the recovered signal. For example, in sound recording systems, it has been found that variations in the relative speed between recording and playback of up to one-tenth of 1% is tolerable due to the inability of the human ear to detect such frequency changes. However, in data recording systems, telemetering recording systems for television signals (and particularly for color television signals) it has been found that a much higher degree of uniformity in the relative speeds is generally necessary. It is especially important in recording television signals to insure that the recovered signals have the same frequency and phase characteristics as the original signals.

This requirement for extreme accuracy, which is even more exacting for recovered color television signals, for example, may better be understood by reference to the standards governing the synthesis of color television signals set up by the Federal Communications Commission. Briefly, the standard color television signal comprises a luminance component and a chrominance component. The luminance component is represented by an electrical signal covering a band of substantially 500 cycles to 4 megacycles per second (mc.) and is basically of the same nature as a standard monochrome television signal. The chrominance component on the other hand is a phase and amplitude modulated carrier having a nominal frequency of approximately 3.58 mc. which is an odd multiple of one-half the television line deflection frequency. This carrier is generally referred to as the color subcarrier. The phase of this subcarrier is modulated by color hue information, and its amplitude is modulated by color saturation information.

During playback, "flutter" (the term applied to the high frequency variations in the relative motion during recording and playback) or "wow" (the low frequency variations) in the magnetic tape recording system produce timing variations in the played back color subcarrier. If the magnitude of such timing or phase variations is in excess of 5° at the color subcarrier frequency over a short period of time, objectionable color changes result on the screen of conventional color television receivers employed to transduce such played back signal.

The velocity of the movable magnetic medium may be maintained constant to a high degree of stability by using the phase of the recorded synchronizing signals as an index of the velocity changes of the tape. In the alternative, a separate control track containing a constant frequency signal may be recorded simultaneously with the information signals. Such a system is described in U.S. Patent No. 2,797,263 issued to Ray M. Dolby. This speed control system has been found very useful in overcoming relatively long term velocity variations in the tape but is relatively ineffective to correct short term tape velocity variations.

Systems have been proposed to overcome the effect of these tape motion vagrancies by variably delaying the recovered signals by an amount necessary to offset any time or phase variations introduced therein. The variable delay is controlled by using a recovered pilot tone or synchronizing component, which has been recorded on the tape along with the information signals, to control the amount by which the recovered information signals are delayed. The recovered synchronizing component is compared to a standard synchronizing signal to obtain an error voltage which is proportional to the time error. Such system is much the same as that employed to maintain constant the relative motion during playback and recording. Unfortunately, this error voltage often varies with changes in the operating characteristics of the electric circuitry associated therewith. This requires that the circuitry be continually recalibrated to provide accurate operation.

It is, therefore, an object of the present invention to provide an improved system for overcoming time variations introduced in signals by recording and reproducing systems employing a movable storage medium.

Another object of this invention is to provide an improved system to reduce the effects of irregular tape velocity in magnetic recording systems.

A further object of this invention is to provide an improved system for correcting for the effects of tape jitter which system requires very little calibration and is substantially independent of variations in component characteristics.

Still another object of the present invention is to provide an improved system for correcting timing errors in a composite television signal reproduced from magnetic tape.

In accordance with the invention, timing or phase errors in signals, containing information as well as synchronizing components recovered from a movable storage medium, are reduced by first storing or delaying the recovered signals and then releasing them at an appropriate rate. Thus, the recovered signals are fed through a tapped or incremental delay means. The phase of the recovered synchronizing components is then compared with the phase of a standard generated synchronizing signal to control the time interval by which the recovered signals are delayed. If the recovered signals are "late," the delay is decreased by increments. If the recovered signals are "early," the delay is increased by increments.

Variation of the delay increments is accomplished by switches coupled to the output of means producing different delay increments. By selectively opening and closing the switches, the delay time is controlled.

In one form of the invention, the recovered signals and the recovered separated synchronizing signals are fed through separate but identical tapped delay lines. The taps of the delay line, to which the synchronizing signals are fed, are coupled to one input of respective separate coincidence gates. The remaining input to each of the the coincidence gates is fed simultaneously by the standard synchronizing signal. Each coincidence gate is actuated by phase coincidence between the standard synchronizing signals and the recovered synchronizing signals and controls the opening or closing of a switch coupled to each of the taps of the delay line containing the recovered information signals.

In another form of the invention, the recovered signal and separated synchronizing signals are fed in parallel to identical sets of delay lines, each corresponding delay line of each set having a different time increment of delay. The output of each delay line containing the information signals is selectively switched "on" or closed to provide the appropriate delay in the manner set forth above.

Figure 2:
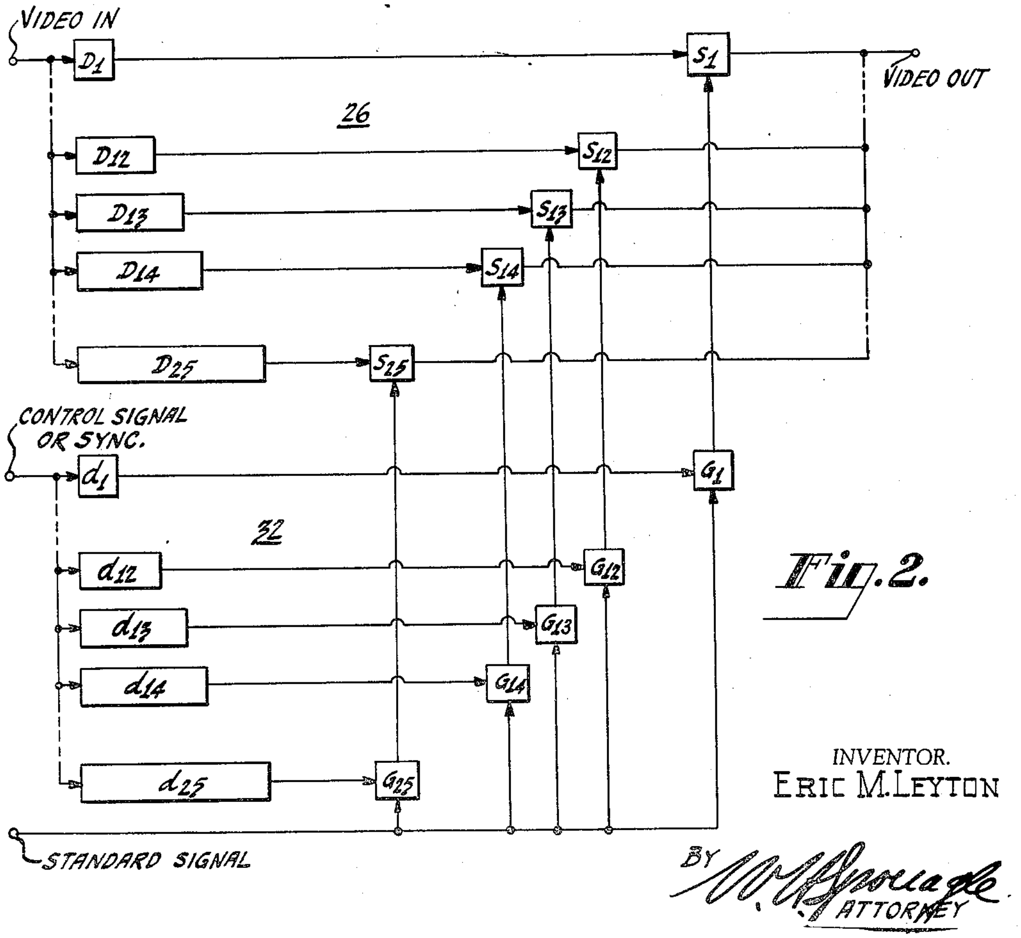
Figure 4:
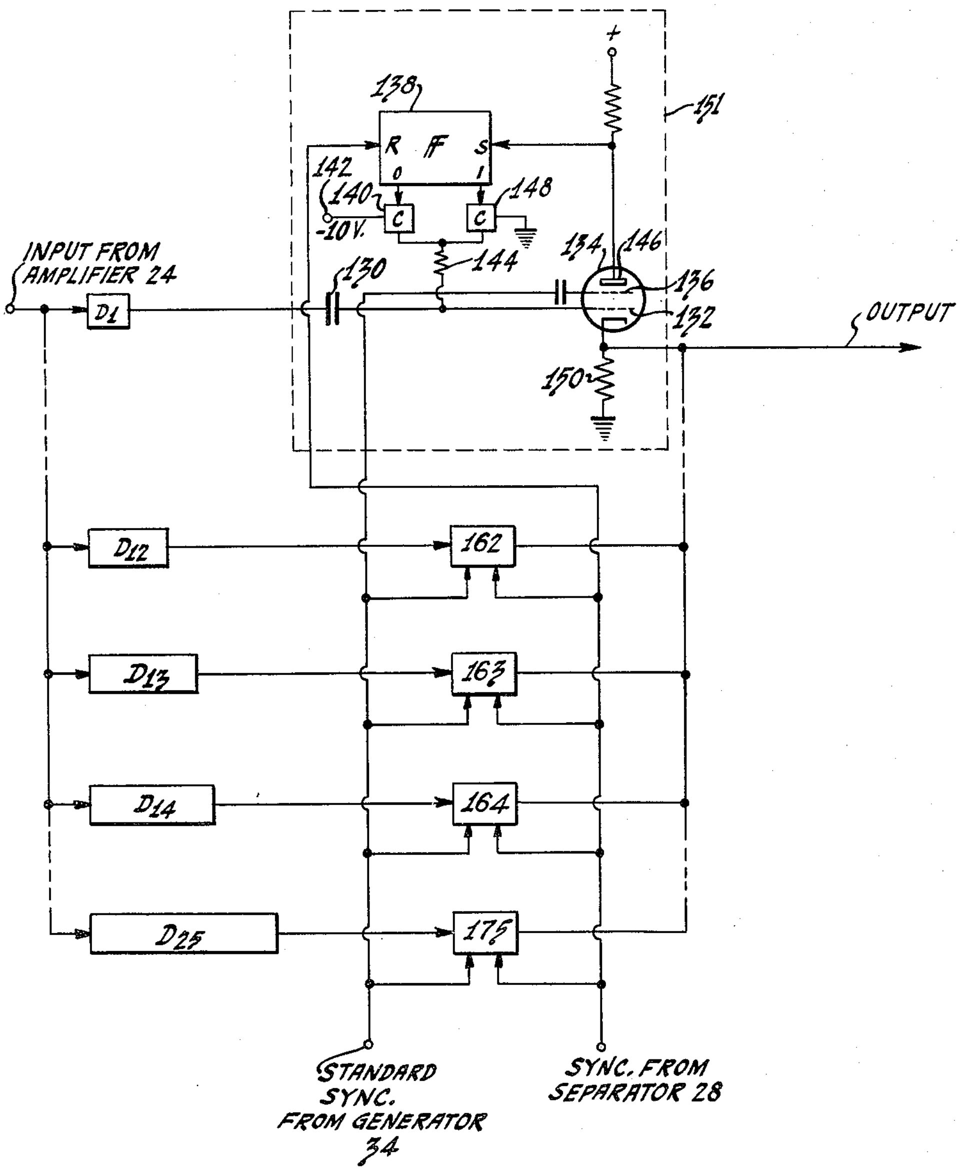
Figure 3:
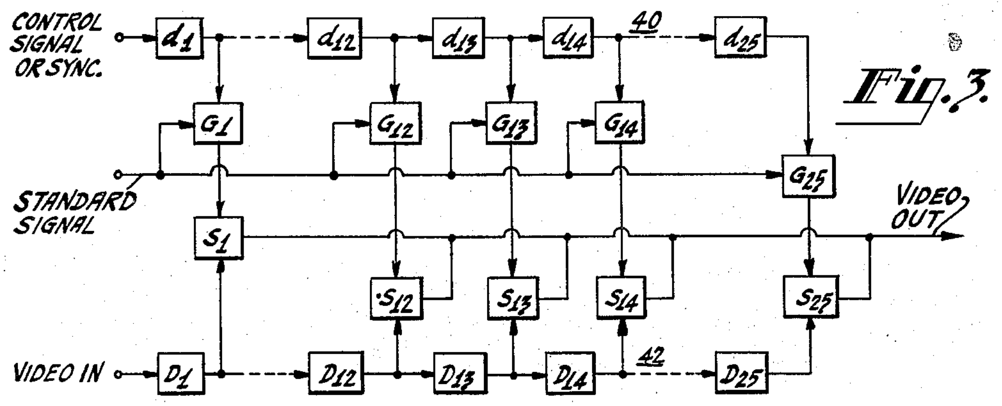
Figure 5:
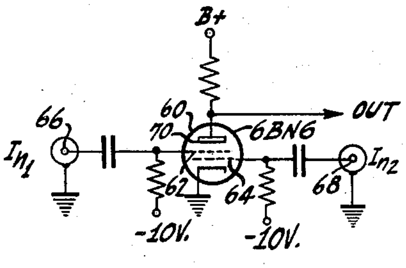
Figure 6:
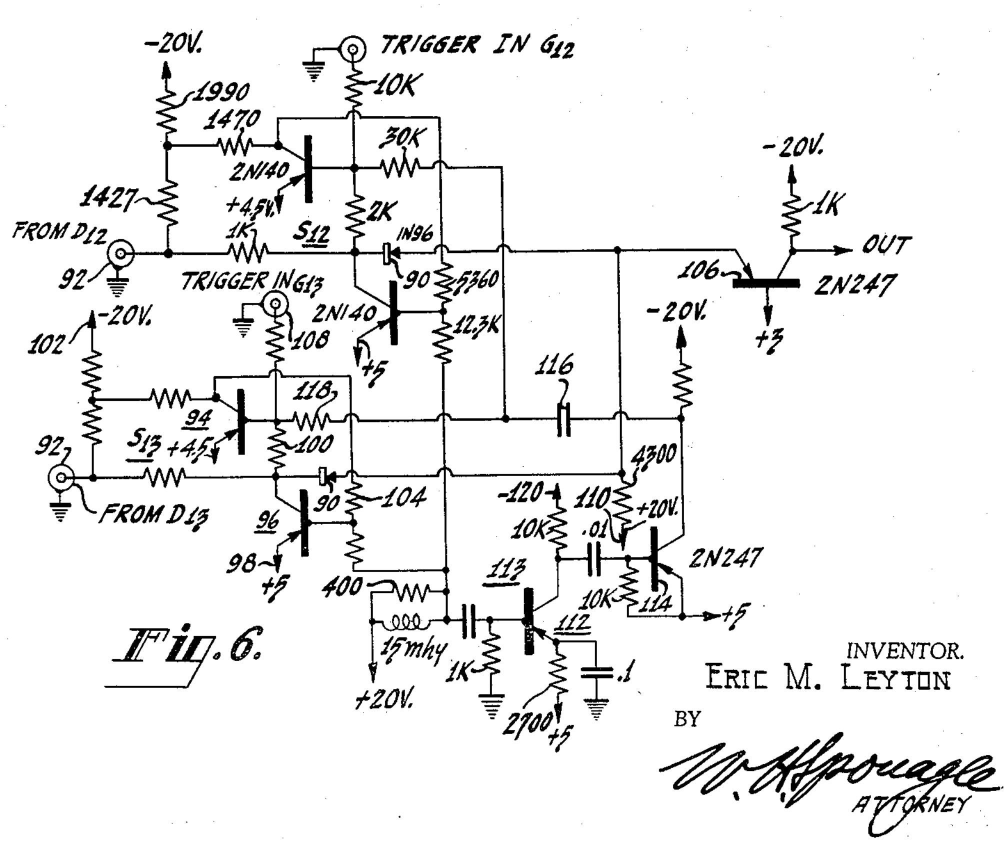

The novel features of this invention as well as the invention itself, both as to its organization and method of operation, will best be understood from the following description, when read in connection with the accompanying drawings, in which like reference numerals refer to like parts, and in which:

Figure 1 is a block diagram and schematic diagram of a delay system according to the invention for correcting the timing errors in reproduced tape recorded signals, Figure 2 is a block diagram of a parallel form of the incremental delay system employed in Figure 1 in accordance with the invention, Figure 3 is a block diagram of a series form of the incremental delay system employed in Figure 1 in accordance with the invention, Figure 4 is another embodiment of the present invention which requires a single set of delay elements, Figure 5 is a coincidence gate circuit which may be used for the coincidence gates of Figures 2 and 3, and Figure 6 is a circuit which may be employed for the switches of Figures 2 and 3.

The present invention will be explained with reference principally to those parts of a tape recording system which are concerned with the recovery of signals such as television signals. The means for recording such signals is well known and is not discussed herein. In the block diagrams illustrated herein, the ground symbol, although omitted in the interest of clarity, may be assumed as present, wherever appropriate, to complete a circuit.

Referring to Figure 1, a movable storage medium, which is illustrated as a magnetic tape 10, is moved in the direction shown by the arrow by the tape transport mechanism 12. The tape transport mechanism 12 may be conventional and is often a capstan driven by an appropriate motor which presses the tape 10 against an idler wheel (not shown). The tape 10 is illustrated in Figure 1 as having longitudinally recorded tracks 14 and 16. These tracks contain previously recorded information signals. For illustration purposes, we shall assume that track 14 contains a composite monochrome television signal including synchronizing signals. The right hand track 16 may contain audio information or (if synchronizing signals were not present on track 14) synchronizing signals or an appropriate constant control frequency signals.

Either this constant control frequency signal or the recovered synchronizing signals from the track 16 may be compared to a locally generated reference frequency signal to derive an error signal which in turn may control the speed of the tape transport mechanism 12 to insure that the relative speeds during playback are the same as those which occurred during recording. Such system is similar to that described in the above mentioned Dolby patent.

A pair of transducers 18 and 20 are placed in close proximity (substantially in contact) with the respective tracks 14 and 16 so as to convert the magnetic variations recorded on the tape 10 into corresponding electrical variations. These electrical variations are amplified and equalized, if necessary (and discriminated if FM recording is used) by the playback amplifier 22 and the video playback amplifier 24 respectively. These playback amplifiers are well known in the art and may, for example, be any amplifier possessing a sufficient band width characteristic to provide the necessary amplification. The particular characteristics of the playback amplifiers 22 and 24 are not important for the purposes of this invention.

The amplified and equalized monochrome television signal is applied to the input of an incremental delay system 26 and to a synchronizing signal separator 28. A switch 30 may selectively connect the separated synchronizing signals from the synchronizing signal separator 28 or the recovered constant control frequency signal from the control track 16 to a delay control circuit 32. The delay control circuit 32 compares the recovered synchronizing signals (or constant control frequency signal) with a locally generated standard synchronizing signal from a standard signal generator 34 and operates to control the amount of time by which the recovered television signal is delayed.

The synchronizing signal separator 28 may be of the type commonly found in commercially available television receivers. For purposes of discussion, it will be assumed that the horizontal sync pulses from the sync separator 28 are selected by the switch 30 and that the standard signal generator 34 provides pulses at the horizontal sync rate, i.e. 15,750 cycles per second. In response to any phase or time deviation of the recorded sync pulses from the standard sync pulses, the recovered television signals are appropriately delayed. The incremental delay system 26, various embodiments of which are illustrated in more detail in Figures 2, 3, and 4, corrects by steps or increments of time any timing errors introduced in the recovered signal due to various mechanical and electrical imperfections in the recording and reproducing equipment. In the present day state of the art, these imperfections may be reduced to a very small figure.

For the purpose of explaining the invention, it will be assumed that such timing errors are less than ±5 microseconds. These remaining timing errors may be reduced to any desired figure within say ±0.1 microsecond by first storing the television signals derived from the magnetic tape 10 and then releasing them to the video output channel at an appropriate rate. For example, if the velocity of the tape on playback is too great such that the recovered signals are more than 0.1 microsecond in advance of their correct position as determined by the comparison which occurs at the end of each horizontal line with the standard sync signals from the generator 34, the amount of time by which the recovered television signals are delayed by the incremental delay system 26 is increased by 0.2 microsecond. If, on the other hand, the video signals derived from the tape 10 are delayed due to the velocity of the tape on playback decreasing, then the amount of time by which the recovered television signals are delayed is decreased by the delay increment of 0.2 microsecond. As the error becomes greater in any direction, the amount of time by which the recovered signal is delayed increases or decreases by successive increments of 0.2 microsecond in order to compensate for such time error.

The time increments may be made as small as desired.

It should further be noted that a continuously variable delay line of the type described, for example in an application Serial No. 451,666, entitled "Tape Recording System," by William D. Houghton, filed August 23, 1954 and assigned to the assignee of this application, may be cascaded with the incremental delay system described herein. The continuously variable delay operates over the range of the minimum time increment selected to provide final correction of the timing errors. In this manner, a rather complete correction for timing errors may be made. The problem of maintaining odd-line interlace, which is often difficult when recording television signals on tape, is substantially reduced. Also, if color television signals are recorded, reducing the timing error in accordance with the invention aids in maintaining the dot interlace relationship in the recovered signal. In order to obtain a more accurate control for a cascaded, continuously variable delay line for use in reproducing color television signals, the color reference burst may be separated from the recovered composite signal and phase compared with a source of standard color subcarrier frequency to control the amount of delay imparted to the recovered signal.

Referring now to Figure 2, there is illustrated a block diagram of one embodiment of the invention wherein the delay control circuit 32 and the incremental delay system block 26 of Figure 1 include a parallel arrangement of delay lines. In Figure 2, the video input is from the video playback amplifier 24 (Figure 1), the control signal or sync input is from the switch 30 (Figure 1), and the standard signal is from the signal generator 34 (Figure 1). The recovered composite television signal is applied at the viedo input in parallel to a plurality of successively longer delay lines $D_1$ to $D_{25}$ inclusive. In accordance with the prior assumption that each delay increment is 0.2 microsecond and that a total delay time of 5 microseconds is necessary, twenty five delay lines, each differing from its adjacent delay lines by the increment of delay of 0.2 microsecond, are required. For the sake of clarity, only the first delay line $D_1$, the last delay line $D_{25}$ and the middle three delay lines $D_{12}$, $D_{13}$, and $D_{14}$ are illustrated. Each of these delay lines may be a conventional type comprising typical LC sections which are terminated by the characteristic impedance of the delay line. Thus the first delay line $D_1$ has a total delay of 0.2 microsecond, and last delay line $D_{25}$ a total delay of 5 microseconds. The output of each of the delay line sections $D_1$ to $D_{25}$ inclusive is coupled through a respective switch $S_1$ to $S_{25}$ to a common video output. The switches $S_1$ to $S_{25}$ must be of an electronic type so that they can be operated rapidly and must be interconnected such that once opened, a given switch will remain open until closed by the operation of another switch. A suitable switch which has been successfully employed with the invention is described in detail in conjunction with Figure 6. The several switches $S_1$ to $S_{25}$ inclusive are opened and closed by the delay control circuit 32.

In the prior art, the amount of delay imparted to the recovered video signals was controlled by an amplitude varying error signal derived by comparing the phase of the recovered sync signal with that of a standard sync signal. Such a system is subject to the objection that the characteristics of the amplitude responsive switch control unit varied during operation. This required constant recalibration. In accordance with the invention, this objection is removed by providing a corresponding set of delay lines $d_1$ to $d_{25}$ which impart successive delays to the separated sync signal from the sync separator 28 (Figure 1). The outputs from each of these delay sections $d_1$ to $d_{25}$ is then compared to the time or phase position of the standard sync signals from the reference or standard source 34 (Figure 1) by the several coincidence gates $G_1$ to $G_{25}$ inclusive. The gates $G_1$ to $G_{25}$ may be any standard coincidence means which provides an output signal upon the coincidence of two input signals. The gates $G_1$ to $G_{25}$ are coupled to the trigger or switching inputs of corresponding ones of the switches $S_1$ to $S_{25}$ to selectively pass the delayed recovered television signal to the output channel.

The standard signal from the generator 34 has its phase so adjusted that if the signal from the magnetic tape is correctly timed, the delayed synchronizing signals from the sync separator 28 (Figure 1), which pass through the thirteenth delay section $d_{13}$, will coincide with the standard synchronizing signals so that the coincidence gate $G_{13}$ will close the switch $S_{13}$. In this manner, the recovered television signals will be delayed by the delay section $D_{13}$ of the incremental delay system 26 and will pass through the closed switch $S_{13}$ to the common video output channel. If the recovered synchronizing signals from the tape 10 are delayed by say 0.2 microsecond, the recovered sync signals and the standard sync signals will coincide at the gate $G_{12}$. In turn, the switch $S_{12}$ will be closed to decrease the time by which the recovered television signal is delayed by 0.2 microsecond thereby compensating for this time error of 0.2 microsecond.

If now the tape speed is increased on playback such that the recovered sync and television signals are advanced from their normally correct positions by 0.2 microsecond, with the next occurrence of a synchronizing signal from the generator 34 coincidence will be obtained at the gate $G_{14}$. The switch $S_{14}$ will subsequently be closed thereby increasing the time by which the recovered television signal is delayed by 0.2 microsecond and the time error is compensated.

This operation places a limitation upon the reference signals employed herein. The period of the sync signals (or constant control frequency signal if other than sync signals are employed) must be greater than 5 microseconds which is the total delay of a delay line. Otherwise, an ambiguity would exist since two reference signals would be present in the delay networks simultaneously. Further, both the recovered sync signal and the standard sync signal should be differentiated such that short duration pulses corresponding to the leading edges of the sync signals may be employed to detect coincidence. Desirably, the pulses which are compared for coincidence should have a time duration less than the incremental differences selected for the delay lines. For the example given above, the pulse duration should be less than 0.2 microsecond.

Figure 2 is thus seen to be a parallel means of controlling the proper delay imparted to a television signal. Figure 3 is a serial version employing the same principles described above. Thus in Figure 3, the recovered television signals are fed into a delay line 42 having a plurality of equal sections $D_1$ to $D_{25}$ inclusive each having a delay of 0.2 microsecond to provide a total delay of 5.0 microseconds. The delay line 42 is terminated with its characteristic impedance and is tapped at each section (0.2 microsecond intervals) by means of switches $S_1$ to $S_{25}$ inclusive. The recovered synchronizing signals are coupled through a similar delay line 40 having the same total delay and corresponding identical taps, which are indicated by the delay sections $d_1$ to $d_{25}$ as the lower delay line 42. The output of each delay line section $d_1$ to $d_{25}$ inclusive is coupled through a respective coincidence gate $G_1$ to $G_{25}$ inclusive to the trigger input of a respective switch $S_1$ to $S_{25}$ inclusive. The gates $G_1$ to $G_{25}$ are fed simultaneously by a standard synchronizing signal from the sync generator 34 of Figure 1.

As in the case of Figure 2, the phase of the standard synchronizing signal is adjusted so that when the recovered television signal from the magnetic tape is correctly timed, switch $S_{13}$ will be closed to pass the recovered video signal to the output channel. Here again if the recovered sync signals are delayed or advanced for some reason due to the vagrancies of the tape recording and reproducing equipment, the appropriate switch is closed by the appropriate gate $G_1$ to $G_{25}$. The timing of the recovered television signal is checked at the end of each horizontal line and the time interval, by which the recovered television signal is stored, varied by increments to correct for such timing variations. In this manner, the timing errors are reduced, in the illustrative embodiment employing 0.2 microsecond increments to correct the recovered signal, to within $\pm 0.1$ microsecond.

Referring now to Figure 4 there is illustrated a further embodiment in accordance with the invention which operates in a similar manner to the embodiments set forth in Figures 2 and 3 but which requires only one set of delay lines. Figure 4 illustrates the parallel form of applicant's invention. In Figure 4, the recovered television signals from the video playback amplifier 24 (Figure 1) are coupled to the inputs of a plurality of delay lines $D_1$ to $D_{25}$ inclusive, each of which differs from the other by a predetermined time increment. As assumed above, this time increment may be considered as 0.2 microsecond. The output of each of the delay lines is coupled to a corresponding different one of a plurality of switch circuits 151 to 175 inclusive. The standard sync signal from the standard signal generator 34 is coupled simultaneously to a second input of each of the switches 151 to 175. A third input to each of the switches is provided from the sync separator 28. Since each of the switches 151 to 175 is identical, only the circuitry for the first switch 151 is illustrated. Therefore only the operation of the first switch 151 will be discussed in detail.

Referring now to the first switch 151, it is seen that the signal from the first delay line $D_1$ is coupled through a capacitor 130 to the first control electrode 132 of a vacuum tube 134. The standard sync pulses from the signal generator 34 also are capacitively coupled to a second control electrode 136. The sync signal, which is derived directly from the sync separator 28 of Figure 1, operates to reset a bistable multivibrator (usually referred to as a flip flop circuit) 138.

A flip flop is a circuit having two stable states, that is conditions, and two input terminals, one of which may be designated as reset, the other set. The flip flop may assume the set condition by application of a high voltage level or pulse on the set input terminal S or the reset condition by the application of a high voltage level or pulse on a reset terminal R. Two outputs are associated with the flip flop circuit which may be termed the set output and the reset output but which are given the Boolean tags of 1 and 0. If the flip flop is in its set condition, the set output voltage is high and the reset output voltage is low. If the flip flop is in its reset condition, the set output terminal voltage is low and the reset terminal voltage is high.

The sync pulse, which occurs before the delayed sync pulse from any of the delay lines $D_1$ to $D_{25}$, applied to the reset input R of the flip-flop 138, resets the flip flop 138 thereby gating "on" a clamp circuit 140. The clamp circuit 140 is coupled to a negative reference source of potential of 10 volts. The clamp circuit 140, operating through a resistor 144, thus clamps the control electrode 132 of the tube 134 to the negative 10 volt source. This potential is sufficient to maintain the tube 134 non-conducting. Thus, the ensuing delayed television signal, applied through the coupling capacitor 130 and having its white values negative going, is unable to pass through the tube 134. If, however, the timing of the positive going sync pulses in the recovered television signals, from the first delay circuit $D_1$, applied through the capacitor 130 coincides with the standard sync pulses applied to the control electrode 136, the tube 134 conducts.

Conduction in tube 134 produces a negative pulse at its anode 146 which sets the flip flop 138. The clamp circuit 140 is now turned off and a second clamp circuit 148 which is returned to a common source of reference potential (ground) is turned on. Tube 134 is now biased such as to allow conduction therein until the flip flop 138 is again reset, at the occurrence of the next horizontal sync pulse, at which time the tube 134 is turned off. Tube 134 is connected as a cathode follower amplifier having a cathode resistor 150. Thus, with the flip flop 138 set, the delayed television signal is passed by the cathode follower to the common output of Figure 1.

It is, therefore apparent that each of the switches 151 to 175 of Figure 4 are normally opened at the beginning of each horizontal line of the recovered television signal by the separated sync signal from the separator 28. Immediately thereafter, that switch receiving a delayed sync pulse which coincides with the standard sync pulse, is closed by the action of the flip flop 138. The tube 134 then functions as a cathode follower passing the signal from the selected delay line until the flip flop is again reset for the next succeeding recovered sync pulse.

As will be apparent to those skilled in the art, the sync pulses that are separated by the sync separator 28 of Figure 1 may be sharpened and applied along with the recovered television signal through each of the delay lines $D_1$ to $D_{25}$ inclusive to provide a more precise switching action in each of the switches 151 to 175. It may further be noted that although each of the delay lines $D_1$ to $D_{25}$ are illustrated in Figure 4 as being in parallel that the serial arrangement illustrated in Figure 3 may also be employed herein.

Referring now to Figure 5, there is illustrated a coincidence gate which may be employed in Figure 2 or 3 of the invention. The coincidence gate includes a vacuum tube 60 having first and second grids 62 and 64. These control grids are biased in a conventional manner so that the tube 60 does not conduct unless both grids are driven in a positive direction at the same time. Thus the recovered synchronizing signals from the sync separator 28 may be applied at the first input terminals 66 and the standard sync signals from the generator 34 applied to the second input terminals 68. In this manner, on coincidence between the recovered sync signals and the standard sync signals, a negative output pulse occurs on the anode 70 of the tube 60. The negative pulse may be applied to the trigger input of the switches or other means for passing a signal. The above coincidence gate is described by way of illustration only and should not be construed as limiting the invention to the particular form.

In Figure 6 there is illustrated a suitable transistor circuit which may be employed for two of the switches $S_1$ to $S_{25}$ illustrated in Figures 2 and 3. In the circuit of Figure 6, only a pair of switches $S_{12}$ and $S_{13}$ are illustrated for the sake of clarity. For use in the invention, the operation of each switch must be such that the switch once closed, remains closed and capable of passing the signal applied to the input terminals thereof until opened. Further, the operation of the switches $S_1$ to $S_{25}$ of Figures 2 and 3 must be such that only one switch is capable of remaining open at a time. For example, in Figure 6, the twelfth switch $S_{12}$, once closed, will remain closed until the thirteenth switch $S_{13}$ is closed; the closing of the thirteenth switch $S_{13}$ functions to open the twelfth switch $S_{12}$; and the thirteenth switch $S_{13}$ then remains closed until opened by a like action on the part of the twelfth switch $S_{12}$.

These switches $S_{12}$ and $S_{13}$ each consist of a typical bistable multivibrator circuit (usually known as a flip flop) that includes a diode 90 so connected as to enable a signal applied to the input terminals 92 from the respective delay lines to be passed. The values of circuit parameters which are suitable for use in the circuit of Figure 6 are indicated adjacent the several components. The resistance values are in ohms unless otherwise indicated and the capacitance values are in microfarads. Although only two of the switches are illustrated, it should be noted that the remaining switches required may be coupled into the circuit in the same manner as the switches $S_{12}$ and $S_{13}$.

To describe the operation of these switches $S_{12}$ and $S_{13}$, we will assume that all switches are in an off or open position. Each switch includes an upper transistor 94 and a lower transistor 96. A pair of cross coupling resistors 100 and 104 interconnecting the collector and base electrodes of the respective transistors 94 and 96 provide the necessary multivibrator action. The circuit components have been chosen such when the lower transistor 96 conducts, it conducts in a saturated condition and therefore provides a low impedance path between its collector and emitter electrodes. Thus a positive 5 volts source 98 is applied through the lower transistor 96 and the cross coupling resistor 100 to the base electrode of the upper transistor 94 maintaining this transistor in a nonconducting condition. In its nonconducting state, the collector electrode of the upper transistor 94 approaches the value of the negative 20 volt source 102. This voltage, when applied through the remaining cross-coupling resistor 104, maintains the lower transistor 96 conducting in its saturated condition. Under these conditions, the diode 90 is open which blocks the passage of the signal applied to the input 92 from the thirteenth delay line $D_{13}$. An output transistor 106 has its emitter electrode coupled to the anode of each of the diodes 90 of each of the switches $S_{12}$ and $S_{13}$. So conducting, the output transistor 106 provides a low impedance path to ground. It may be noted that the combination of the lower transistor 96, the diode 90, and the common output transistor 106 provide a pi network, both legs of which have a very low impedance to ground due to the conducting transistors 96 and 106 and a very high impedance across the top consisting of the open, nonconducting diode 90.

Assume now that a negative trigger pulse is applied to the trigger input terminal 108 of the thirteenth switch $S_{13}$ from the thirteenth gate $G_{13}$ of Figure 3 or 4. The upper transistor 94 is momentarily biased on and begins to conduct. The collector electrode of the upper transistor 94 is driven in a positive direction tending to bias the lower transistor 96 into a state of nonconduction which in turn aids conduction in the upper transistor 94. This action becomes cumulative due to the cross coupling resistors 100 and 104, and the upper transistor 94 soon becomes fully conductive, and the lower transistor 96 nonconductive.

The lower transistor 96 now presents a high impedance to ground and allows the diode 90 to become forward biased by the negative 20 volt supply 102 and positive 20 volt supply 110. Diode 90 thus becomes conducting and provides a low impedance from the input terminal 92 to the emitter electrode of the common output transistor 106. The switch is now closed.

A pair of feedback transistors 112 and 114 respectively are coupled to provide a feedback amplifier 113 to open all other switches in the circuit once a given switch $S_{13}$ is closed. Thus, with the twelfth switch $S_{12}$ in a closed condition, upon receipt of the trigger pulse from the thirteenth gate $G_{13}$ as assumed above, the positive pulse provided from the collector electrode of the upper transistor 94 passes through the resistor 104 to the input of the feedback amplifier 113. This positive pulse is amplified and passed through a coupling capacitor 116 and a resistor 118 to the base electrodes of the upper transistors 94 of each of the switches. This pulse is a positive going pulse of approximately 30 volts for the circuit parameters given. This positive pulse tends to switch open each of the switches by rendering the upper transistor 94 nonconducting. All switches are thus turned off such that the diodes 90 present a high impedance to the input signal except for that switch which has received the trigger pulse. That switch in this instance was assumed to be switch $S_{13}$. Since the trigger pulse and the feedback pulse from the transistor amplifier 113 are both applied to the same point in the circuit, namely, to the base electrode of the upper transistor 94, it is important that the trigger pulse applied from the gate $G_{13}$ be large enough to overcome the feedback pulse and remain closed.

It is therefore apparent that the above described transistor switches provide an operation wherein any given switch may be closed to provide a low impedance path from a particular delay line to the common output transistor amplifier 106. This particular switch remains closed until another switch receives a trigger pulse. Upon receipt of the trigger pulse by the other switch, the previously closed switch is opened by the feedback amplifier 113 as are all remaining switches except that switch which has received the trigger pulse. It may be also noted that the switch shown in Figure 6 is merely illustrative of one switch which may be employed with this circuit feature of the invention. Other suitable switches may be employed as desired.

There has thus been described a very simple and reliable type incremental delay line which may be employed to compensate for time variations which occur during the recording and reproducing of information signals from a movable storage medium such as a magnetic tape. These time variations may be corrected virtually to any desired value by incremental units of time. The system is not subject to variations of the characteristics of the components thereof and requires a minimum amount of calibration to achieve a proper operating condition. If desired, this incremental type correction system may be combined with a continuously variable corrector which operates over the range of incremental unit of time employed to provide a final correction for the time variations.

What is claimed is:

1. In a system for reproducing signals including information components and synchronizing components which have been recorded on a movable storage medium having a movement that is subject to variations, apparatus for compensating for the effect of said movement variations comprising, means for recovering said signals from said medium, means coupled to said recovering means for incrementally delaying said recovered signals, a source of standard synchronizing signals, and means coupled to said source and to said delay means for controlling the amount of said incremental delay introduced into said signals to thereby provide within the nearest time increment a correction for said movement variations.

2. A system for reproducing signals including information components and synchronizing components which have been recorded on a movable storage medium having a movement that is subject to variations, including apparatus for compensating for the effect of said variations comprising, means for recovering said signals from said medium, delay means having a plurality of outputs, each providing respectively a plurality of different increments of delay, coupled to said recovering means for incrementally delaying said recovered signals, a source of standard synchronizing signals, means coupled to said source and to said delay means outputs for comparing the timing relation of said recovered synchronizing components and said standard synchronizing signal to derive control signals indicative of said movement variations in said movable storage medium, and a plurality of switching means coupled respectively to the outputs of each of said delay means and to said comparing means and responsive to said control signals to thereby select a signal from said delay means suitably delayed to compensate for said variations in the movement of said storage medium.

3. In a system for reproducing signals including information components and control frequency components which have been recorded on a movable storage medium having a movement that is subject to variations, apparatus for overcoming timing variations introduced into the reproduced signals as a result of said variations in the movement of said storage medium comprising, means for recovering said signals from said medium, a plurality of delay means coupled to said recovering means for delaying said recovered signals by increments of time, each of said delay means having an output, a source of a standard control frequency signal, means coupled to said source and to each of said delay means outputs for determining the phase coincidence of said recovered control frequency signal and said standard frequency signal, said phase coincidence being representative of said timing variations, a plurality of switching means coupled respectively to each of said incremental delay means outputs and to said coincidence determining means to selectively pass the delayed recovered signals, said coincidence means controlling the operation of said switching means to thereby delay said recovered signals by incremental amounts in accordance with said timing variations.

4. The apparatus set forth in claim 3 wherein each of said incremental delay means are connected in parallel and wherein each of said switching means has an output coupled to a common signal output terminal.

5. The apparatus set forth in claim 3 wherein each of said incremental delay means are connected in series and provide an equal delay time and wherein each of said switching means has an output coupled to a common signal output terminal.

6. The apparatus set forth in claim 4 wherein each of said incremental delay means provides a mutually exclusive delay time.

7. In a system for reproducing signals including information components and pilot tone components which have been recorded on a movable storage medium having a movement that is subject to variations, apparatus for overcoming timing variations introduced into said recovered signals as a result of said variations in the movement of said storage medium comprising means for recovering said signals from said medium, a plurality of delay means coupled to said recovering means for delaying said recovered signals by time steps, each of said delay means having an output, a source of a standard pilot tone signal, means coupled to said source and to said delay means outputs for determining coincidence between the phase of said recovered pilot tone signal and the phase of said standard frequency signal to obtain switching signals indicative of said timing variations, a plurality of switching means coupled respectively to the outputs of said step delay means and to said coincidence determining means to selectively pass a delayed signal from said delay means, said switching means being responsive to said switching signal whereby said recovered signals are delayed by an amount of time in accordance with said timing variations.

8. In a storage system of the character described making use of an elongated storage medium having a movement that is subject to variations, means for reproducing signals including information signals and a constant synchronizing signal recorded on said storage medium, means for recovering said signals from said medium, a source of a standard synchronizing signal, a first plurality of delay circuits each providing different time delay and each having an input coupled to said recovering means to receive said recovered signals and also having an output, a second plurality of delay circuits substantially identical to said first plurality each having an input coupled to said recovering means to receive said recovered synchronizing signals, and also having an output, a plurality of coincidence gates having two inputs and an output, each of said coincidence gates having one of said inputs coupled to said source and the other of said inputs coupled to the output of a different one of said second plurality of delay circuits, a plurality of switches corresponding respectively to each of said coincidence gates, each of said switches being coupled to the output of a different one of said first plurality of delay circuits and to the output of a corresponding one of said coincidence gates, and a common output terminal coupled to the output of each of said switches whereby said recovered information signal is selectively passed from the outputs of different ones of said delay circuits depending upon the phase relationship between said recovered synchronizing signals and said standard synchronizing signal to thereby correct for the effect of said movement variations of the storage medium.

9. In the system set forth in claim 8 each of the delay circuits in each of the said first plurality of delay circuits differing from one another by a predetermined time increment.

10. In a storage system of the character described making use of an elongated storage medium having a movement that is subject to variations, means for reproducing signals including information signals and a constant synchronizing signal recorded on said storage medium, means for recovering said signals from said medium, a source of a standard synchronizing signal, a first delay line having taps at equal intervals and having an input coupled to said recovering means to receive said recovered signals, a second delay line having taps of equal intervals substantially identical to said first delay line, said second delay line having an input coupled to said recovering means to receive said recovered synchronizing signals, a plurality of coincidence gates each having two inputs and an output, each of said coincidence gates having one of said inputs coupled to said source and the other of said inputs coupled to a different one of the taps on said second delay line to thereby detect the timing relation between said standard synchronizing signal and said constant synchronizing signal, a plurality of switches corresponding respectively to each of said coincidence gates, each of said switches being coupled to a different one of the taps on said first delay line and to the output of a corresponding one of said coincidence gates and adapted to be actuated thereby upon coincidence between said synchronizing signals, and a common output terminal coupled to the output of each of said switches whereby said recovered information signal is derived from the outputs of different ones of the taps on first delay line depending upon said timing relation between said recovered synchronizing signals and said standard synchronizing signals to thereby correct for the effect of the movement variations of the storage medium.

11. The combination set forth in claim 10 wherein each of said switches are interconnected such that only one switch at a time is open to pass the recovered information signals from the taps of said first delay line.

12. A storage system making use of a magnetic tape having a movement that is subject to variations for reproducing a composite television signal including picture signals and synchronizing signals recorded on said magnetic tape, comprising means for recovering said signals from said magnetic tape, a source of a standard synchronizing signal, means coupled to said recovering means for separating said recovered synchronizing signals from said recovered picture signals, a first plurality of individual means to delay signals by a predetermined time increment, each of said delay means being coupled in series with each other, said series coupled delay means being coupled to said recovering means to receive said composite signals, a second plurality of individual means to delay signals by a predetermined time increment substantially identical to said first plurality of delay means, each of said second plurality of delay means being coupled in series with each other, said second plurality of series coupled delay means being coupled to said separating means to receive said separated synchronizing signals, a plurality of coincidence gates having two inputs and an output, each of said coincidence gates having one of said inputs coupled to said source and the other of said inputs coupled to a different one of said second plurality of delay means, a plurality of switches coupled respectively to a different one of said coincidence gates and adapted to be opened thereby, each of said switches also being coupled to a different one of said first plurality of delay means and adapted to pass said recovered composite signals from said first delay means upon actuation by said coincidence gates, and a common output terminal coupled to the output of each of said switches, whereby said recovered composite signal is delayed by varying time increments depending upon the phase relationship between said recovered synchronizing signals and said standard synchronizing signal to thereby correct for the effect of said movement variations of the magnetic tape.

13. The system as set forth in claim 12 wherein the open condition of each of said switches is mutually exclusive and wherein any given switch once opened remains open until another switch is actuated to the open condition.

14. A storage system, making use of an elongated storage medium having a movement that is subject to variations, for reproducing signals including information signals and a constant synchronizing signal recorded on said storage medium, comprising means for recovering said signals from said medium, a source of a standard synchronizing signal, a delay circuit having an input coupled to said recovering means to receive said recovered information signals and also having an output, a second delay circuit substantially identical to said first delay circuit having an input coupled to said recovering means to receive said recovered synchronizing signals and also having an output, a first and a second coincidence gate each having two inputs and an output, each of said coincidence gates having one of said inputs coupled to said source, said first coincidence gate having the other of said inputs coupled to said recovering means to receive said recovered synchronizing signals, said second coincidence gate having the other said inputs coupled to the output of said second delay circuit, said coincidence gates being adapted to determine the phase relation between said standard synchronizing signal and said recovered synchronizing signals, said phase relation being indicative of said movement variations, a first and a second switch coupled respectively to the output of said first and said second coincidence gate and adapted to be actuated thereby, said first switch being also coupled to said recovering means to pass said recovered information signals when actuated by said first coincidence gate, said second switch being also coupled to the output of said first delay circuit to pass information signals received therefrom when actuated by said second coincidence gate, and a common output terminal coupled to the output of each of said switches whereby said recovered information signal is either delayed by the increment of said first delay circuit or not depending upon said phase relationship between said recovered synchronizing signals and said standard synchronizing signal to thereby correct for the effect of said movement variations of the storage medium.

15. A storage system making use of an elongated storage medium having a movement that is subject to variations for producing signals including information signals and a constant synchronizing signal recorded on said storage medium comprising means for recovering said signals from said medium, a source of a standard synchronizing signal, means coupled to said recovering means to separate said synchronizing signals from said information signals, a first and a second coincidence gate each having two inputs and an output, each of said coincidence gates having one of said inputs coupled to said source, a first and a second delay circuit coupled between said separating means to receive said recovered synchronizing signals and the other input of respective different ones of said coincidence gates, a first and a second switch each having a switching input adapted to open and close each said switch coupled respectively to the outputs of said first and second coincidence gates, said coincidence gates operating to open and close said switches selectively depending upon the phase relationship between said recovered synchronizing signals and said standard synchronizing signal, each of said switches also having a switched input, third and fourth delay circuits corresponding respectively to said first and second delay circuits coupled between said recovering means to receive said recovered signals and said switched inputs of said switches, and a common output terminal coupled to the output of each of said switches whereby said recovered signals are delayed by different fixed time increments in accordance of said movement variations of the storage medium.

16. In a storage system of the character described making use of an elongated storage medium having a movement that is subject to variations, means for reproducing signals including information signals and a constant control frequency signal recorded on said storage medium, means for recovering said signals from said medium, a source of a standard control frequency signal, a first plurality of delay circuits each having an input coupled to said recovering means to receive said recovered signals and also having an output, a second plurality of delay circuits substantially identical to said first plurality each having an input coupled to said recovering means to receive said recovered control frequency signal, and also having an output, a plurality of means to detect coincidence between two signals, each of said coincidence means having two inputs, one of said inputs being coupled to said source and the other of said inputs being coupled to the output of a different one of said second plurality of delay circuits, a plurality of means for passing a signal applied to a first input under control of a switch signal applied to a second input, each of said passing means having its first input coupled to the output of a different one of said first plurality of delay circuits and its second input coupled to the output of a corresponding one of said coincidence means, and a common output terminal coupled to the output of each of said signal passing means whereby said recovered signals are derived from the outputs of different ones of said first delay circuits depending upon the phase relationship between said recovered control frequency signal and said standard control frequency signal to thereby correct for the effect of said movement variations of the storage medium.

17. In a storage system of the character described making use of an elongated storage medium having a movement that is subject to variations, means for reproducing signals including information signals and a constant control frequency signal recorded on said storage medium, means for recovering said signals from said medium, a source of a standard control frequency signal, a first delay line having taps at equal intervals and having an input coupled to said recovering means to receive said recovered information signals, a second delay line having taps at equal time intervals substantially identical to said first delay line, said second delay line having an input coupled to said recovering means to receive said recovered synchronizing signals, a plurality of means to detect coincidence between said recovered and said standard synchronizing signals, each of said coincidence means having two inputs, one of said inputs being coupled to said source and the other of said inputs being coupled to the output of a different tap of said second delay line, a plurality of means for passing a signal applied to a first input under control of a switching signal applied to a second input, each of said passing means having its first input coupled to a different tap of said first delay line and its second input coupled to the output of a corresponding one of said coincidence means to be actuated thereby, and a common output terminal coupled to the output of each of said signal passing means whereby said recovered information signal derived from the taps of said first delay line is delayed by different time increments in accordance with said movement variations of said storage medium.

18. The system set forth in claim 17 wherein the period of said standard control frequency signal and the period of said constant control frequency signal is substantially the same and is less than the total time delay of said first delay line.

19. In a system for reproducing signals including information components and synchronizing components which have been recorded on a movable storage medium having a movement that is subject to variations, apparatus for compensating for the effect of said movement variations comprising, means for recovering said signals from said medium, means coupled to said recovering means for incrementally delaying said recovered signals, a source of standard synchronizing signals, and means coupled to said source and to said delay means for determining the timing relation of said standard synchronizing signals and said synchronizing components and for controlling according to said timing relation the amount of said incremental delay introduced into said signals to thereby provide within the nearest time increment a correction for said movement variations.

References Cited in the file of this patent

UNITED STATES PATENTS

| | | |
|---|---|---|
| 2,817,701 | Johnson | Dec. 24, 1957 |
| 2,828,478 | Johnson | Mar. 25, 1958 |

FOREIGN PATENTS

| | | |
|---|---|---|
| 1,126,885 | France | Dec. 3, 1956 |